1

3,803,202
PROCESS FOR THE PRODUCTION OF 2-CYANO-3,4,5,6-TETRAHALOGENBENZOIC ACID ALKYL ESTERS
Jost von der Crone, Riehen, Theodor Grauer, Arlesheim, Basel-Land, and Andre Pugin, Riehen, Switzerland, assignors to Ciba-Geigy AG, Basel, Switzerland
No Drawing. Filed Mar. 1, 1971, Ser. No. 119,823
Claims priority, application Switzerland, Mar. 18, 1970, 4,057/70
Int. Cl. C07c *121/52*
U.S. Cl. 260—465 D ........ 7 Claims

ABSTRACT OF THE DISCLOSURE

Process for the production of 2-cyano-3,4,5,6-tetrahalogenbenzoic acid alkyl esters from the ammonia salt of a 2-cyano-3,4,5,6-tetrahalogenbenzoic acid, characterized in that this salt is reacted, in the presence of a completely or partially water-soluble organic solvent, with a neutral sulphuric acid alkyl ester or sulphonic acid alkyl ester. The products are useful as intermediates for pigments.

DETAILED DISCLOSURE

The present invention relates to a new simplified process for the production of 2-cyano-3,4,5,6-tetrahalogenbenzoic acid alkyl esters, for example 2-cyano-3,4,5,6-tetrabromo- and especially 2-cyano-3,4,5,6-tetrachlorobenzoic acid alkyl esters. These esters, which are of importance as intermediate products for the production of pigments, have hitherto only been obtained by a roundabout method from the ammonium salt of 2-cyano-3,4,5,6-tetrachlorobenzoic acid, whereby this salt was firstly converted into the silver, barium, calcium salt or, with the aid of an ion exchanger, also into the sodium salt, and only then treated with an esterification agent. Reference is made, for example, to the journal "Farbe und Lack," vol. 72, p. 209, and to Example 1 of the Swiss Pat. 348,496. The direct esterification of an ammonium salt of the phthalic acid series is not known in the literature. Attempts to react the ammonium salt of 2-cyano-3,4,5,6-tetrachlorobenzoic acid with acid to give 2-cyano-3,4,5,6-tetrachlorobenzoic acid lead to the formation of a mixture of 4,5,6,7-tetrachlorophthalamic acid, 4,5,6,7-tetrachlorophthalimide and 3,4,5,6-tetrachlorophthalic acid.

In contrast to 2-cyanobenzoic acid, 2-cyano-3,4,5,6-tetrachlorobenzoic acid is not known in the literature, and the applicant's own experiments to produce it show that the compound is not stable. Also the production of a pure sodium salt from the ammonium salt of 2-cyano-3,4,5,6-tetrachlorobenzoic acid, is not successful with sodium hydroxide solution on account of secondary reactions; it was therefore necessary to proceed with the aid of an ion-exchanger.

Surprisingly, it has now been found that 2-cyano-3,4,5,6-tetrahalogenbenzoic acid alkyl ester can now be obtained direct from the ammonium salt of a 2-cyano-3,4,,5,6-tetrahalogenbenzoic acid, for example, the 2-cyano-3,4,5,6 - tetrabromo- and especially the 2-cyano-3,4,5,6-tetrachlorobenzoic acid, by reacting these salts in the presence of a completely or partially water-soluble organic solvent, with a neutral sulphuric acid alkyl ester or with a sulphonic acid alkyl ester. Preferably, the operation is performed in the presence of an acid-binding agent. The ester is thereby obtained in high yield and with a good degree of purity. This was not to be expected since at the same time the ammonium ion too is methylated. As is known, lower alkylamines particularly are readily completely alkylated to the quaternated compound [cp. Houbem-Weyl: Methoden der Org. Chemie (Methods in Org. Chemistry), vol. 11/2, p. 594]. This is the reason why also in the literature (cp. F. H. Stodola, J. Org. Chemie 29, 2490 (1964), in the case of corresponding reactions, tertiary amines having a higher alkyl radical are used as acid-binding agents. Surprising too is the high degree of purity of the reaction product. Since, under the reaction conditions, for example, the unstable free acid could be formed, or, on the other hand, secondary reactions could occur owing to the effect of the base, it was to be expected that appreciable proportions of secondary products would be obtained. These secondary products are disturbing, however, with regard to the use of the ester as intermediate product for pigment production, and would have to be removed by an additional purification operation. The new process is considerably simpler and can be carried out more quickly than the known processes. The ester obtained by application of the new process can be further used direct for pigment production, or can also be stored, without the decomposition occurring which occurs in the case of contaminated products.

Preferably, the process according to the invention is carried out in a mixture of water and a partially water-soluble organic solvent, such as an aliphatic ketone, preferably one of the formula $C_mH_{2m+1}COC_nH_{2n+1}$, in which $m$ and $n$ are whole numbers from 1 to 3, the sum of $m+n$ being 3 or 4, especially methyl ethyl ketone or also methyl-n-propyl ketone, methylisopropyl ketone or diethyl ketone. But also the reaction in a completely water-miscible solvent, particularly alcohols, ethers and ketones, in the absence or presence of water, leads to products having a high degree of purity. Such solvents are, in particular, dioxane, acetone, dimethylformamide and isopropyl alcohol, then also methyl and ethyl alcohol, ethylene glycol monomethyl or -ethyl ether, ethylene glycol, tetrahydrofuran, dimethylacetamide, furfuryl alcohol, tetrahydrofurfuryl alcohol, tetrahydrothiophenedioxide, N - methylpyrrolidone-2 and dimethylsulphoxide.

Suitable neutral sulphuric acid alkyl esters are, in particular, dialkyl esters such as di-n--propyl ester and di-n-butyl ester, especially dimethyl and diethyl sulphate; suitable sulphonic acid alkyl esters are, e.g. the toluenesulphonic acid methyl and -ethyl esters.

With the application of acid-binding agents, suitable as such are, in particular, bases such as alkali hydroxides or alkali carbonates or -bicarbonates, e.g. sodium carbonate and sodium bicarbonate, but also organic bases such as triisopropanolamine and dicyclohexylethylamine.

Preferably, both the acid-binding agents and the sulphuric acid esters are used in excess, especially of 2–5 times the stoichiometrical amount.

The ammonium salt to be used of 2-cyano-3,4,5,6-tetrachlorobenzoic acid can be produced in a known manner by reaction of the asymmetrical acid chloride of tetrachlorophthalic acid with ammonia. A particular advantage of the process according to the invention lies in the fact that crude and still moist ammonium salt can be used. The complete synthesis of the tetrachloro-o-cyanobenzoic acid methyl ester becomes consequently simpler and more economical. The reaction is advantageously carried out at a temperature of 20 to 90° C.

Example 1

To a suspension of 30.2 g. of ammonium salt (recrystallized from water) of tetrachloro-o-cyanobenzoic acid in 100 ml. of methanol are added 42 g. of sodium bicarbonate and 63 g. of dimethylsulphate. The mixture is heated to 30–40°, whereby firstly a solution is formed, and the reaction product then crystallizes out from this solution. After two to three hours, the reaction mixture is poured into 1 litre of water, the whole is thoroughly stirred, and the precipitate filtered off under suction. After drying, 29 g. of reaction product are obtained which, for complete purification, can be recrystallized from methanol. In this manner is obtained tetrachloro-o-cyanobenzoic acid methyl ester having a melting point of 83–84°.

If, instead of methanol, the same amount of ethanol is used in this example, and instead of dimethylsulphate, 77 g. of diethylsulphate are used, with otherwise the same procedure, then ethyl ester is obtained which, after recrystallization from ethanol, melts at 73–75°.

If, instead of dimethylsulphate, 93 g. of toluene-sulphonic acid methyl ester, or 100 g. of toluenesulphonic acid ethyl ester, are used, then likewise is obtained tetrachloro-o-cyanobenzoic acid methyl or -ethyl ester.

Example 2

Into a reaction vessel are placed together 33.2 g. of recrystallized ammonium salt of tetrachloro-o-cyanobenzoic acid, 66 g. of dioxane, 44 g. of water, 37 g. of sodium bicarbonate, and 55 g. of dimethylsulphate. The mixture is heated to 30°, whereupon the temperature rises, because of the heat of reaction, by about 10°. After approximately one hour the exothermic reaction ceases. Stirring is then continued for a further 1–2 hours, and the reaction mixture afterwards allowed to stand, whereby two layers form. These are separated from each other, and the dioxane-containing layer is concentrated by evaporation to dryness. Thus obtained as residue is the pure tetrachloro-o-cyanobenzoic acid methyl ester. After recrystallization from methanol are obtained 27 g. of the ester, M.P. 83–84°.

If it is required to dispense with additional purification by recrystallization, then to the reaction mixture are added, with stirring, 200 g. of water, whereby the reaction product precipitates as a white precipitate. This is filtered off under suction, and well washed with water. Obtained after drying are 31 g. of tetrachloro-o-cyanobenzoic acid methyl ester, M.P. 82–83°, which can be used direct, without additional purification, for pigment production.

If, in this example, the dioxane is replaced by one of the following solvents:

isopropyl alcohol,
ethylene glycol monomethyl ether or -ethyl ether,
ethylene glycol,
acetone,
tetrahydrofuran,
dimethylformamide,
dimethylacetamide,
furfuryl alcohol,
tetrahydrofurfuryl alochol,
tetrahydrothiophenedioxide,
N-methylpyrrolidone-2- or
dimethylsulphoxide, the procedure being otherwise as described in Example 2, then likewise is obtained a tetrachloro-o-cyanobenzoic acid methyl ester of high purity.

Example 3

An amount of 55 g. of moist ammonium salt of tetrachloro-o-cyanobenzoic acid having a dry weight of 55%, which was obtained as crude product from the reaction of asymmetrical tetrachlorophthalyl chloride with ammonia, is stirred together with a mixture of 145 g. of water and 290 g. of methyl ethyl ketone, and the whole heated to 50°. To this mixture are simultaneously added dropwise 55 g. of dimethylsulphate and a 30% aqueous sodium hydroxide solution. The amount of sodium hydroxide solution and the rate of addition are so chosen that the pH-value of the reaction mixture is 6 to 7.5; and, at the same time, the temperature is maintained between 50° and 60°. After completion of the addition of dimethylsulphate, sodium hydroxide solution is added dropwise until the pH-value remains constant between 6 and 7. The reaction mixture is filtered if it still contains insoluble matter. The two formed layers are subsequently separated from each other. The top layer is concentrated in vacuo at 90 to 100°/12 mm. Hg. Thus obtained is a melt of the reaction product; the melt is then extracted, for removal of the water-soluble constituents still present, with 100 ml. of hot water. The reaction product is a melt heavier than water; the melt is then separated from the water, placed into a porcelain dish, and allowed to solidify. In this manner are obtained 28 g. of tetrachloro-o-cyanobenzoic acid methyl ester, M.P. 80–82°.

If, in this example, the methyl ethyl ketone is replaced by methyl-n-propyl ketone or methylisopropyl ketone or diethyl ketone, then likewise is obtained a tetrachloro-o-cyanobenzoic acid methyl ester of high purity which is suitable, without an additional purification operation, for the reproduction of pigment.

Example 4

An amount of 30.2 g. of crude dried ammonium salt of tetrachloro-o-cyanobenzoic acid is placed together with 100 ml. of water, 150 ml. of acetone, and 47.3 ml. of dimethylsulphate. The whole is stirred for one hour at room temperature; it is subsequently heated to 40–50°, and this temperature then maintained for one hour. The reaction mixture, which separates into two layers, is poured into a solution of 350 ml. of water and 30 ml. of concentrated ammonia. The reaction product, which has crystallized out, is then filtered off and washed with water. After drying, 19 g. of tetrachloro-o-cyanobenzoic acid methyl ester are obtained. The thin-layer-chromatogram (solvent-mixture of benzene and ligroin in the ratio of 80:20) shows that this crude product is very pure.

If less dimethylsulphate is used than is stated in this example, e.g. only 28.5 ml., and 57.3 g. of triisopropanolamine are additionally added, then 22.2 g. of tetrachloro-o-cyanobenzoic acid methyl ester are obtained which likewise is of high purity, and directly suitable for pigment production.

Example 5

An amount of 48 g. of ammonium salt of tetrabromo-o-cyanobenzoic acid is added to a mixture of 500 ml. of water, 760 ml. of acetone and 100 g. of triisopropanolamine. Whilst stirring is maintained, 48 ml. of dimethyl sulphate are subsequently added. After one hour, the reaction mixture is heated to 50°, and this temperature is held for a further hour. The reaction mixture is cooled to room temperature, and then poured on to a mixture of 2,500 ml. of water and 170 ml. of concentrated ammonia. The precipitate is filtered off, washed with water until neutral, and then dried. Thus obtained are 43 g. of tetrabromo-o-cyanobenzoic acid methyl ester which, after recrystallization from methanol, has a melting point of 122°–124°.

We claim:

1. A process for the production of 2-cyano-3,4,5,6-tetrachloro and -tetrabromobenzoic acid methyl or ethyl esters which comprises reacting the ammonia salt of 2-cyano-3,4,5,6-tetrachloro or -tetrabromobenzoic acid with an excess over the stoichiometrical amount of sulphuric acid methyl or ethyl ester in the presence of a ketone solvent of the formula $C_mH_{2m+1}COC_nH_{2n+1}$ in which $m$ and $n$ are whole numbers from 1 to 3 and the sum of $m+n$ is 3 or 4 at a temperature of 20–90° C.

2. A process as claimed in claim 1, wherein the ammonia salt of 2-cyano-3,4,5,6-tetrachlorobenzoic acid is used as starting material.

3. Process according to claim 1, wherein the operation is performed in the presence of an acid-binding agent.

4. Process according to claim 3, wherein an alkali base, an alkali carbonate, or an alkali bicarbonate is used as acid-binding agent.

5. Process according to claim 1, wherein the reaction is performed in the presence of said ketone solvent in a mixture with water.

6. Process according to claim 1, wherein that methyl ethyl ketone is used as organic solvent.

7. Process according to claim 1, wherein the reaction is performed in the absence of water.

References Cited
UNITED STATES PATENTS
3,076,815   2/1963   Pugin _____ 260—465 X LEWIS GOTTS, Primary Examiner
D. H. TORRENCE, Assistant Examiner